Patented Dec. 23, 1941

2,267,313

UNITED STATES PATENT OFFICE 2,267,313

PRODUCTION OF GAMMA ACETO PROPYL ETHER

Joseph R. Stevens, Plainfield, and Gustav A. Stein, Elizabeth, N. J., assignors, by mesne assignments, to Research Corporation, New York, N. Y., a corporation of New York No Drawing. Application September 27, 1939, Serial No. 296,804

2 Claims. (Cl. 260—345)

This invention relates to the production of $\gamma$ aceto propyl ether, and has for its objects the provision of this ether and a simple and effective method of making it.

It has been found that, when $\gamma$ aceto propyl alcohol is halogenated, the resulting $\gamma$ halogen $\gamma$ aceto propyl alcohol often reacts spontaneously with itself to form $\gamma$ halogen $\gamma$ aceto propyl ether. In accordance with the present invention, the unhalogenated $\gamma$ aceto propyl ether is produced and the thus formed ether may be treated with a halogen, if desired. $\gamma$ halogen $\gamma$ aceto propyl ether and the related halogenated alcohol are useful in the preparation of thiazole derivatives which may be used in the production of synthetic vitamin $B_1$.

The above mentioned and other objects and features of the invention will be apparent from the following detailed description of a specific example thereof:

100 cc. of $\gamma$ aceto propyl alcohol, containing a drop of concentrated hydrochloric acid to speed up the reaction, were distilled several times at 10 mm. pressure and in each case the fraction boiling at 105° to 115° C. was collected. These fractions were combined and fractioned at 10 mm. pressure, giving a product boiling at 110° to 112° C. at this pressure. This product was $\gamma$ aceto propyl ether. Calc'd. for $C_{10}H_{18}O_3$; MW 186; C=64.57; H=9.75. Found; MW 182 (dioxane); C=64.28; H=9.79. $d^{25°}=0.0968$; $N^{20}_D=1.4435$.

$\gamma$ aceto propyl ether is readily and quickly hydrolized by means of a small amount of water into $\gamma$ aceto propyl alcohol. Since $\gamma$ aceto propyl alcohol assumes several tautomeric forms, there are likewise several possible structures for $\gamma$ aceto propyl ether.

Thus, the structural formula of $\gamma$ aceto propyl alcohol may be written as follows:

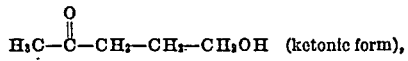
(ketonic form), I

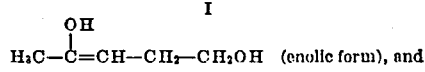
(enolic form), and II

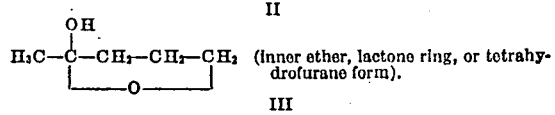
(inner ether, lactone ring, or tetrahydrofurane form). III

It is probable that any solution of this product contains some or all of these forms in equilibrium. The above outlined ketonic form undoubtedly is in tautomeric equilibrium with the enolic form of the molecule. These tautomeric forms are, however, so readily interconvertible, in harmony with, enol-keto tautomers in general, that for the sake of simplicity the enolic forms will be ignored in the following discussion.

The possible structural formula of $\gamma$ aceto propyl ether may be presented as follows:

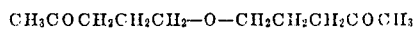
IV

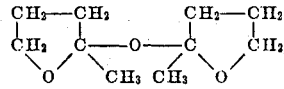 and
V

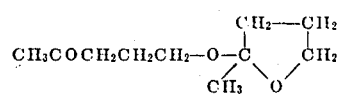
VI

All of the available evidence indicates that $\gamma$ aceto propyl ether possesses one and only one tetrahydrofurane group and has the formula designated VI. However, the structures are labile and more or less admixture of other forms may exist. Accordingly, the appended claims are intended to embrace all forms of the ether unless specifically limited to cover only certain forms thereof.

What is claimed is:

1. The compound having the formula

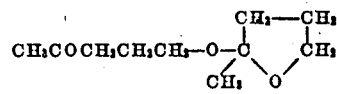

2. The method of making $\gamma$ aceto propyl ether which comprises distilling $\gamma$ aceto propyl alcohol at a temperature of about 110° to 112° C. and at a pressure of about 10 mm. of mercury.

JOSEPH R. STEVENS.
GUSTAV A. STEIN.